US010344225B2

(12) United States Patent
Mukherjee et al.

(10) Patent No.: US 10,344,225 B2
(45) Date of Patent: Jul. 9, 2019

(54) PROCESS TO UPGRADE PARTIALLY CONVERTED VACUUM RESIDUA

(71) Applicant: Lummus Technology Inc., Bloomfield, NJ (US)

(72) Inventors: Ujjal K. Mukherjee, Montclair, NJ (US); Mario C. Baldassari, Morris Plains, NJ (US); Marvin I. Greene, Clifton, NJ (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 187 days.

(21) Appl. No.: 15/407,917

(22) Filed: Jan. 17, 2017

(65) Prior Publication Data

US 2017/0121614 A1    May 4, 2017

Related U.S. Application Data

(62) Division of application No. 14/550,384, filed on Nov. 21, 2014, now Pat. No. 9,695,369.

(51) Int. Cl.
*C10G 67/00* (2006.01)
*C10G 67/04* (2006.01)
(Continued)

(52) U.S. Cl.
CPC .............. *C10G 67/049* (2013.01); *C10G 7/06* (2013.01); *C10G 21/003* (2013.01); *C10G 47/00* (2013.01);
(Continued)

(58) Field of Classification Search
CPC .. C10G 67/049; C10G 47/00; C10G 67/0454; C10G 21/003; C10G 7/06; C10G 65/14;
(Continued)

(56) References Cited

U.S. PATENT DOCUMENTS 8,287,720 B2 * 10/2012 Baldassari ............ C10G 21/003
208/96

FOREIGN PATENT DOCUMENTS

| RU | 2337939 C2 | 11/2008 |
| RU | 2517186 C2 | 5/2014 |
| WO | 2013142313 A1 | 9/2013 |

OTHER PUBLICATIONS

Written Opinion issued in related International Application No. PCT/US2015/057511 dated Jun. 1, 2017 (8 pages).

(Continued)

*Primary Examiner* — Randy Boyer
*Assistant Examiner* — Juan C Valencia
(74) *Attorney, Agent, or Firm* — Osha Liang LLP

(57) ABSTRACT

Processes for upgrading partially converted vacuum residua hydrocarbon feeds are disclosed. The upgrading processes may include: steam stripping the partially converted vacuum residua to generate a first distillate and a first residuum; solvent deasphalting the first residuum stream to generate a deasphalted oil and an asphaltenes fraction; vacuum fractionating the deasphalted oil to recover a deasphalted gas oil distillate and a heavy deasphalted residuum; contacting the first distillate and the deasphalted gas oil distillate and hydrogen in the presence of a first hydroconversion catalyst to produce a product; contacting the heavy deasphalted residuum stream and hydrogen in the presence of a second hydroconversion catalyst to produce an effluent; and fractionating the effluent to recover a hydrocracked atmospheric residua and a hydrocracked atmospheric distillate.

11 Claims, 3 Drawing Sheets

(51) Int. Cl.
*C10J 3/00* (2006.01)
*C10G 65/14* (2006.01)
*C10G 7/06* (2006.01)
*C10G 21/00* (2006.01)
*C10G 47/00* (2006.01)

(52) U.S. Cl.
CPC .............. *C10G 65/14* (2013.01); *C10G 67/00* (2013.01); *C10G 67/0454* (2013.01); *C10J 3/00* (2013.01); *C10G 2300/1077* (2013.01); *C10G 2300/206* (2013.01); *C10J 2200/00* (2013.01)

(58) Field of Classification Search
CPC .............. C10G 67/00; C10G 2300/206; C10G 2300/1077; C10J 3/00; C10J 2200/00
See application file for complete search history.

(56) References Cited

OTHER PUBLICATIONS

Office Action issued in corresponding Russian Application No. 2017121598/04 dated Mar. 7, 2018, and English translation thereof (10 pages).

\* cited by examiner

PROCESS TO UPGRADE PARTIALLY CONVERTED VACUUM RESIDUA

CROSS-REFERENCE TO RELATED APPLICATION

This application, pursuant to 35 U.S.C. § 120, claims benefit as a divisional to U.S. patent application Ser. No. 14/550,384 filed Nov. 21, 2014, now U.S. Pat. No. 9,695,369, which is incorporated by reference in its entirety.

BACKGROUND

Hydrocarbon compounds are useful for a number of purposes. In particular, hydrocarbon compounds are useful, inter alia, as fuels, solvents, degreasers, cleaning agents, and polymer precursors. The most important source of hydrocarbon compounds is petroleum crude oil. Refining of crude oil into separate hydrocarbon compound fractions is a well-known processing technique.

Crude oils range widely in their composition and physical and chemical properties. Heavy crudes are characterized by a relatively high viscosity, low API gravity, and high percentage of high boiling components (i.e., having a normal boiling point of greater than 510° C. (950° F.)).

Refined petroleum products generally have higher average hydrogen to carbon ratios on a molecular basis. Therefore, the upgrading of a petroleum refinery hydrocarbon fraction is generally classified into one of two categories: hydrogen addition and carbon rejection. Hydrogen addition is performed by processes such as hydrocracking and hydrotreating. Carbon rejection processes typically produce a stream of rejected high carbon material which may be a liquid or a solid; e.g., coke for fuel or metallurgical applications.

The higher end boiling point components, sometimes referred to as bottom-of the-barrel components, may be converted using various upstream conversion processes. In some embodiments, vacuum residua streams may be partially converted. The vacuum residua streams, however, may only be partially converted in order to prevent significant downtimes in processes downstream due to fouling and deposition of carbonaceous deposits.

Hydrocracking processes can be used to upgrade higher boiling materials within the partially converted vacuum residua by converting them into more valuable lower boiling materials. For example, a partially converted vacuum residua fed to a hydrocracking reactor may be converted to a hydrocracking reaction product. The unreacted partially converted vacuum resid may be recovered from the hydrocracking process and either removed or recycled back to the hydrocracking reactor in order to increase the overall vacuum residua conversion.

The conversion of partially converted vacuum residua in a hydrocracking reactor can depend on a variety of factors, including feedstock composition; the type of reactor used; the reaction severity, including temperature and pressure conditions; reactor space velocity; and catalyst type and performance. In particular, the reaction severity may be used to increase the conversion. However, as the reaction severity increases, side reactions may occur inside the hydrocracking reactor to produce various byproducts in the form of coke precursors, sediments (i.e., precipitated asphaltenes, and other deposits) as well as byproducts which may form a secondary liquid phase. Excessive formation of such sediments can hinder subsequent processing and can deactivate the hydrocracking catalyst by poisoning, coking, or fouling. Deactivation of the hydrocracking catalyst can not only significantly reduce the residua conversion, but can also require more frequent change-outs of expensive catalysts. Formation of a secondary liquid phase not only deactivates the hydrocracking catalyst, but also limits the maximum conversion, thereby resulting in a higher catalyst consumption, and which can defluidize ebullated-bed catalysts. This leads to formation of "hot zones" within the catalyst bed, exacerbating the formation of coke deposits, which further deactivates the hydrocracking catalyst.

Sediment formation inside the hydrocracking reactor is also a strong function of the feedstock quality. For example, asphaltenes that may be present in the partially converted vacuum residua feed to the hydrocracking reactor system are especially prone to forming sediments when subjected to severe operating conditions. Thus, separation of the asphaltenes from the partially converted vacuum residua in order to increase the conversion may be desirable.

One type of process that may be used to remove such asphaltenes from the partially converted vacuum residua feed is solvent deasphalting. For example, solvent deasphalting typically involves physically separating the lighter hydrocarbons and the heavier hydrocarbons including asphaltenes based on their relative affinities for the solvent. A light solvent, such as a $C_3$ to $C_7$ hydrocarbon, can be used to dissolve or suspend the lighter hydrocarbons, commonly referred to as deasphalted oil, allowing the asphaltenes to transfer into a separate phase. The two phases are then separated and the solvent is recovered. Additional information on solvent deasphalting conditions, solvents and operations may be obtained from U.S. Pat. Nos. 4,239,616; 4,440,633; 4,354,922; 4,354,928; and 4,516,281.

Several methods for integrating solvent deasphalting with hydrocracking in order to remove asphaltenes from vacuum residua are available. Such processes are disclosed in U.S. Pat. No. 7,214,308 which disclose contacting the vacuum residua feed in a solvent deasphalting system to separate the asphaltenes from deasphalted oil. The deasphalted oil and the asphaltenes are then each reacted in separate hydrocracking reactor systems.

Moderate overall vacuum residua conversions (about 65% to 70% as described in U.S. Pat. No. 7,214,308) may be achieved using such processes, as both the deasphalted oil and the asphaltenes are separately hydrocracked. However, the hydrocracking of asphaltenes as disclosed is at high severity/high conversion, and may present special challenges, as discussed above. For example, operating the asphaltenes hydrocracker at high severity in order to increase the conversion may also cause a high rate of sediment formation, and a high rate of catalyst replacement. In contrast, operating the asphaltenes hydrocracker at low severity will suppress sediment formation, but the per-pass conversion of asphaltenes will be lower.

Processes for upgrading virgin residua hydrocarbon feeds are described in U.S. Pat. No. 8,287,720 which describes hydroprocessing virgin residua in a first reaction unit, solvent deasphalting the effluent, and feeding the deasphalted effluent to a second reaction unit. However, the hydrocracking of residua hydrocarbon feeds and the subsequent process steps are operated at conditions which strain the operating units and produce products having less desirable qualities.

In order to achieve a higher overall partially converted vacuum residua conversion, such processes typically require a high recycle rate of the unreacted partially converted vacuum resid back to one or more of the hydrocracking reactors. Such high-volume recycle can significantly increase the size of the hydrocracking reactor and/or the upstream solvent deasphalting system.

SUMMARY OF THE DISCLOSURE

Partially converted vacuum residuum has been found to be significantly different from virgin vacuum resid in terms of reactivity and processability. Partially converted vacuum residua may be difficult to hydrocrack while still achieving high residua conversion. Furthermore, improving the economics of partially converted vacuum residua-fed hydrocracking processes may be desired, for example, reducing the overall equipment size of hydrocracking reactors and/or solvent deasphalters, improving the quality of the vacuum distillates as feedstocks to distillate hydrocrackers, improving the operability of the distillate hydrocrackers, reducing the operating severity in the distillate hydrocrackers, and requiring less frequent hydrocracking catalyst change-outs.

Processes according to embodiments herein have been found effective in processing partially converted vacuum residua and the like, in some embodiments, to greater than 87.5%, 92.5%, 95% or even 97% overall vacuum residua conversion.

In one aspect, embodiments disclosed herein relate to a process for upgrading a partially converted vacuum residua. The process may include the following steps: stripping the partially converted vacuum residua to generate a first distillate and a first residuum; solvent deasphalting the first residuum to generate a deasphalted oil and an asphaltenes fraction; vacuum fractionating the deasphalted oil to recover a deasphalted gas oil distillate and a heavy deasphalted residuum; contacting the first distillate and the deasphalted gas oil distillate and hydrogen in the presence of a first hydroprocessing catalyst to produce a first hydroprocessing effluent; contacting the heavy deasphalted residuum and hydrogen in the presence of a second hydroconversion catalyst to produce a second hydroprocessing effluent; and fractionating the second hydroprocessing effluent to recover a hydrocracked atmospheric residua and a hydrocracked atmospheric distillate.

In another aspect, embodiments disclosed herein relate to a process for upgrading a partially converted vacuum residua. The process may include the following steps: stripping with a mass transfer device the partially converted vacuum residua to generate a first distillate and a first residuum; deasphalting with a solvent deasphalting unit the first residuum to generate a deasphalted oil and an asphaltenes fraction; fractionating with a vacuum fractionation unit the deasphalted oil to recover a deasphalted gas oil distillate and a heavy deasphalted residuum; contacting the first distillate and the deasphalted gas oil distillate and hydrogen in the presence of a first hydroprocessing catalyst an ebullated bed hydroconversion reactor to produce a first hydroprocessing effluent; contacting the heavy deasphalted residuum and hydrogen in the presence of a second hydroconversion catalyst in a fixed bed hydroconversion reactor system to produce a second hydroprocessing effluent; and fractionating with an atmospheric fractionation unit the second hydroprocessing effluent to recover a hydrocracked atmospheric residua and a hydrocracked atmospheric distillate.

In another aspect, embodiments disclosed herein relate to a system for upgrading partially converted residuum hydrocarbons. The system may include the following components: a mass transfer device to strip a partially converted residuum hydrocarbon stream into a first distillate stream and a first residuum stream; a solvent deasphalting unit for recovering a deasphalted oil stream and an asphaltenes stream from the first residuum stream; a vacuum fractionation unit to fractionate the deasphalted oil stream to recover a deasphalted gas oil stream and a heavy deasphalted residuum stream; an ebullated bed hydroconversion reactor system for contacting the heavy deasphalted residuum stream and hydrogen with a first hydroconversion catalyst to produce a first effluent; an atmospheric fractionation unit to fractionate the first effluent to recover a hydrocarbon atmospheric distillate stream and a hydrocarbon atmospheric residuum stream; a fixed bed hydroconversion reactor system for contacting at least one of the first distillate stream, the deasphalted gas oil stream, and the hydrocarbon atmospheric distillate stream to produce a second effluent.

Other aspects and advantages will be apparent from the following description and the appended claims.

DETAILED DESCRIPTION

Figure 1:
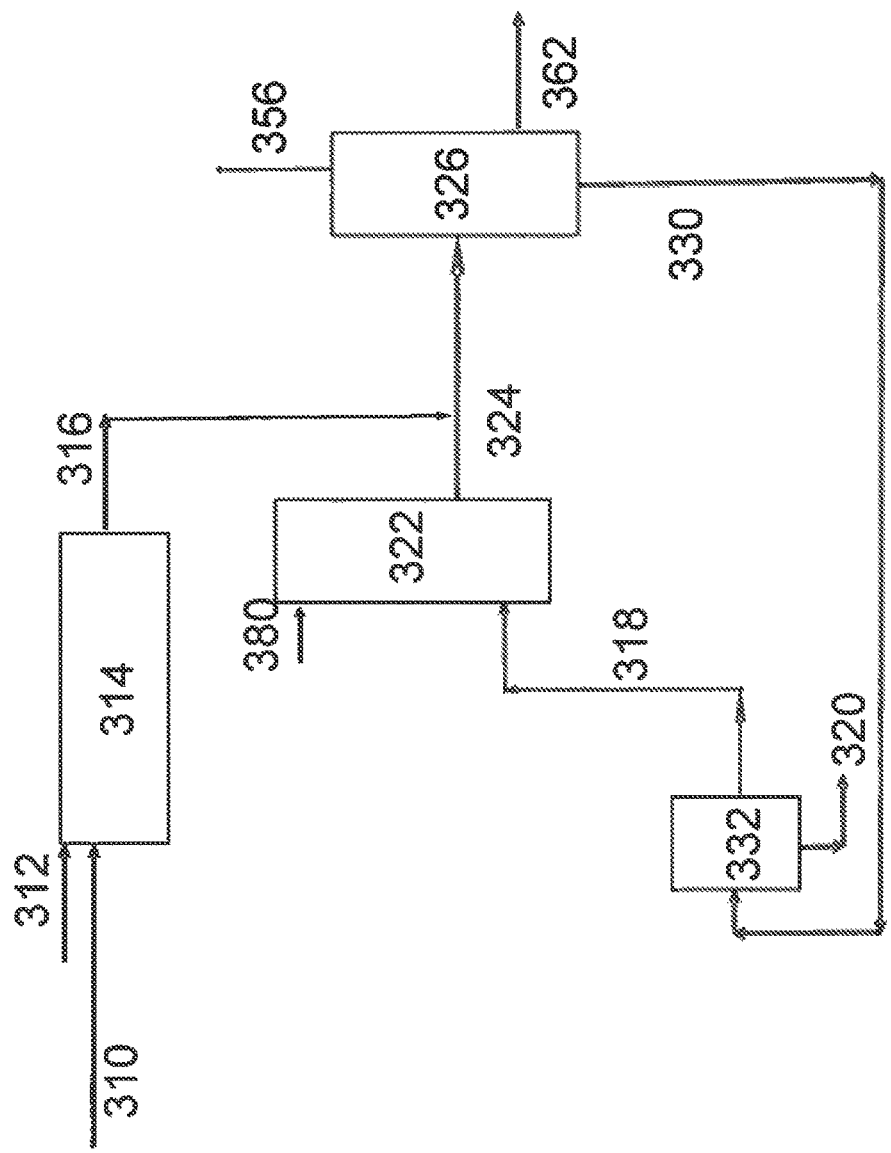
FIG. 1 is a simplified flow diagram of current hydrocracking and deasphalting processes for upgrading virgin vacuum residua according to embodiments disclosed herein.

Embodiments disclosed herein relate generally to processes for upgrading partially converted heavy petroleum feedstocks. In one aspect, embodiments disclosed herein relate to processes for hydrocracking and deasphalting partially converted vacuum residua. In other aspects, embodiments disclosed herein relate to processes for increasing the conversion of residua feedstocks to about 95% or about 98%.

Partially converted vacuum residuum hydrocarbon (resid) feedstocks useful in embodiments disclosed herein may include various heavy crude and refinery fractions which have been previously processed in one or more conversion processes to at least partially convert some of the hydrocarbons therein. For example, partially converted vacuum residua hydrocarbon feedstocks may include vacuum residua hydrocarbon feeds which have been partially processed in hydrocracking units, vac residua coking units, hydrothermolysis units, hydropyrolysis units, pyrolysis units, oil shale retorting units, biomass pyrolysis units, biomass hydropyrolysis units, biomass hydrothermolysis units, tar sands extraction units, steam assisted gravity drainage processes, toe to heel air injection processes, an in situ petroleum extraction processes, or a combination thereof, each of which may be process derived, hydrocracked, partially desulfurized, and/or low-metal streams. The above partially converted vacuum residua feedstocks may include various impurities, including asphaltenes, metals, organic sulfur, organic nitrogen, and Conradson carbon residue (CCR). The initial boiling point of the partially converted vacuum residua is typically greater than about 510° C. (900° F.), about 537° C. (1000° F.) or about 565° C. (1050° F.).

Partially converted vacuum residua feedstocks are chemically different from virgin vacuum residua feedstocks. The partially converted vacuum residua feedstocks may be provided from virgin vacuum residua feedstocks processed in one or more upstream conversion processes. Easy-to-convert species are typically already converted in the upstream conversion processes, resulting in the partially converted vacuum residua feedstocks containing quantities of difficult-to-convert species. These difficult-to-convert species typically require high reaction severity to convert to higher value hydrocarbons. The high reaction severity may increase side reactions typically making it difficult to achieve the high overall conversions, provided by the solutions discussed below. The side reactions form byproducts which harm the catalyst and/or produce sediment. By use of partially converted vacuum residua feedstocks and steam stripping of such feedstocks while incorporating a downstream solvent deasphalting unit and a downstream ebullated-bed unit to hydrocrack the deasphalted vacuum residua, the recovered hydroprocessed vacuum gas oils will have better properties and will ease conditions in the downstream fixed-bed distillate hydroprocessing unit. In some embodiments, the polynuclear cyclic index (PCI) which quantitates the polynuclear aromatics concentration in heavy petroleum oils, may decrease in the vacuum gas oil produced from the process and the production of diesel may be increased. Downstream processing units may operate at lower pressures and those that utilize catalyst may improve their catalyst cycle length.

Processes according to embodiments disclosed herein for conversion of partially converted vacuum residua hydrocarbon feedstocks to lighter hydrocarbons include initially steam stripping the feedstock into a first distillate stream and a first residuum stream. The first residuum stream may then be separated in a solvent deasphalting unit to recover a deasphalted oil fraction and an asphaltenes fraction. The solvent deasphalting unit may be, for example, as described in one or more of U.S. Pat. Nos. 4,239,616, 4,440,633, 4,354,922, 4,354,928, 4,536,283, and 7,214,308, each of which is incorporated herein by reference to the extent not contradictory to embodiments disclosed herein. In the solvent deasphalting unit, a light hydrocarbon solvent may be used to selectively dissolve desired components of the first residuum and reject the asphaltenes. In some embodiments, the light hydrocarbon solvent may be a $C_3$ to $C_7$ hydrocarbon, and may include propane, butane, isobutane, pentane, isopentane, hexane, heptane, and mixtures thereof. In some embodiments, the solvent may be an aromatic solvent or a mixture of gas oils or a light naphtha produced in the process itself or available in the refinery.

The deasphalted oil fraction may be fractionated to recover a deasphalted gas oil distillate stream and a heavy deasphalted residuum stream. The deasphalted gas oil distillate stream may be reacted with hydrogen over a hydrocracking catalyst in a distillate hydroprocessing reaction unit to convert at least a portion of the hydrocarbons to lighter molecules, such as, but not limited to a naphtha fraction, a kerosene fraction, and a diesel fraction. The heavy deasphalted residuum stream may be reacted with hydrogen over a hydrocracking catalyst in a deasphalted vacuum residua hydrocracking reaction unit to convert at least a portion of the hydrocarbons to lighter molecules.

Catalysts used in the distillate hydroprocessing reaction unit and the deasphalted vacuum residua hydrocracking reaction unit may be the same or different. Suitable hydrotreating and hydrocracking catalysts useful in the distillate hydroprocessing reaction unit and the deasphalted vacuum residua hydrocracking reaction unit may include one or more elements selected from Groups 4-12 of the Periodic Table of the Elements. In some embodiments, the hydrotreating and hydrocracking catalysts according to embodiments disclosed herein may comprise, consist of, or consist essentially of one or more of nickel, cobalt, tungsten, molybdenum and combinations thereof, either unsupported or supported on a porous substrate such as silica, alumina, titania, or combinations thereof. As supplied from a manufacturer or as resulting from a regeneration process, the hydroconversion catalysts may be in the form of metal oxides, for example. If necessary or desired, the metal oxides may be converted to metal sulfides prior to or during use. In some embodiments, the hydrocracking catalysts may be pre-sulfided and/or pre-conditioned prior to introduction to the hydrocracking reactor. For example, one or more catalysts as described in U.S. Pat. Nos. 4,990,243, 5,069,890, 5,071,805, 5,073,530, 5,141,909, 5,277,793, 5,366,615, 5,439,860, 5,593,570, 6,860,986, 6,902,664, and 6,872,685 may be used in embodiments herein, each of which are incorporated herein by reference with respect to the hydrocracking catalysts described therein.

The distillate hydroprocessing reaction unit may include one or more reactors in series and/or parallel. Reactors suitable for use in the distillate hydroprocessing reaction unit may include any type of hydroprocessing reactor. Asphaltenes may be present in the deasphalted gas oil distillate stream only to a minor extent, thus a wide variety of reactor types may be used in the first reaction unit. For instance, a fixed bed reactor may be considered where the metals and Conradson carbon residue of the deasphalted gas oil distillate stream fed to the first hydrocracking reaction unit is less than 100 wppm and 10%, respectively. The number of reactors required may depend on the feed rate, and the level of conversion desired in the distillate hydroprocessing reaction unit. In some embodiments, the distillate hydroprocessing reaction unit is a single fixed bed reactor. In some embodiments, the catalysts used in the distillate hydroprocessing reaction unit may include distillate hydrotreating catalysts in extruded forms which may contain zeolitic components as well as conventional Ni/Co/Mo/W on oxide supports. In other embodiments, catalysts which may be used in the distillate hydroprocessing reaction unit are as described in one or more of U.S. Pat. Nos. 4,990,243, 5,069,890, 5,071,805, 5,073,530, 5,141,909, 5,277,793, 5,366,615, 5,439,860, 5,593,570, 6,860,986, 6,902,664, and 6,872,685, each of which are incorporated herein by reference with respect to the hydrocracking catalysts described therein. The distillate hydroprocessing reaction unit upgrades vacuum gas oils, atmospheric gas oils and diesel components produced in other units of the system.

The deasphalted vacuum residua hydrocracking reaction unit may include one or more reactors in series and/for parallel. Reactors suitable for use in the deasphalted vacuum residua hydrocracking reaction unit may include any type of hydrocracking reactor, including ebullated bed reactors, fluidized bed reactors, slurry reactors and moving bed reactors, among others. The number of reactors required may depend on the feed rate, the overall target vacuum residua conversion level, and the level of conversion desired. In some embodiments, the deasphalted vacuum residua hydrocracking reaction unit may be one or more ebullated bed reactor. In some embodiments, the catalyst in the deasphalted vacuum residua hydrocracking reaction unit may be an amorphous catalyst which is fluidizable, having a pore size distribution amenable to high metals content and high CCR content feedstocks. In other embodiments, the catalyst in the deasphalted vacuum residua hydrocracking reaction unit may be a dispersed phase or slurry catalyst including molybdenum sulfide type materials. In yet other embodiments, the catalyst in the deasphalted vacuum residua hydrocracking reaction unit may include one or more elements selected from Groups 4-12 of the Periodic Table of the Elements. In some embodiments, the catalyst in the deasphalted vacuum residua hydrocracking reaction unit may comprise, consist of, or consist essentially of one or more of nickel, cobalt, tungsten, molybdenum and combinations thereof, either unsupported or supported on a porous substrate such as silica, alumina, titania, or combinations thereof.

The reaction product from the deasphalted vacuum residua hydrocracking reaction unit may then be separated to recover a hydrocracked atmospheric distillate stream and a hydrocracked atmospheric residua stream, the latter of which includes unreacted partially converted vacuum residua feed, asphaltenes, and any resid-boiling range products resulting from hydrocracking of the asphaltenes contained in the partially converted vacuum residua feedstock. Distillate hydrocarbon fractions recovered may include, among others, atmospheric distillates, such as hydrocarbons having a normal boiling temperature of less than about 343° C., and vacuum distillates, such as hydrocarbons having a normal boiling temperature of less than from about 482° C. to about 566° C. In some embodiments, the hydrocracked atmospheric distillate stream may be fed to the first hydrotreating/hydrocracking reaction unit.

Processes according to embodiments disclosed herein thus include a solvent deasphalting unit upstream of the first and second hydrocracking reaction units, providing for conversion of at least a portion of the asphaltenes to lighter, more valuable hydrocarbons. Hydrocracking of deasphalted gas oil distillate streams and heavy deasphalted residuum stream may provide for overall vacuum residua conversions that may, be greater than about 60 wt % in some embodiments; greater than 80 wt % in other embodiments; greater than 90 wt % in other embodiments; greater than 92.5 wt % in other embodiments; greater than 95 wt % in yet other embodiments; and greater than 98 wt % in yet other embodiments. The overall vacuum residua conversion is defined as the % conversion or disappearance of 510° C.+(or 538° C.+ or 566° C.+) components from a virgin vacuum residua feed to the upstream bottom-of-the-barrel conversion unit, i.e., stream 100, relative to the net amount in a solvent deasphalter bottoms stream 20, the latter quantity of which represents the 40% or 20% or 10% or 7.5% or 5% or 2% of the material that remains unconverted in embodiments disclosed herein.

The distillate hydroprocessing reaction unit may be operated at a temperature in the range from about 360° C. to about 440° C.; from about 380°V to about 430° C. in other embodiments. Hydrogen partial pressure may be in the range from about 100 ban to about 200 bara in some embodiments; from about 125 to about 155 bara in other embodiments. The hydroprocessing reactions may also be conducted at a liquid hourly space velocity (LHSV) in the range from about 0.1 hr$^{-1}$ to about 3.0 hr$^{-1}$ in some embodiments; from about 0.2 hr$^{-1}$ to about 2 hr$^{-1}$ in other embodiments. The hydroprocessing reactions may also be conducted at a hydrogen to oil ratio of about 5,000 to about 20,000 scf/bbl. In some embodiments, the distillate hydroprocessing reaction unit may process one or more distillate streams, or combinations thereof. The distillate hydroprocessing reaction unit may include a combination of hydrotreating and hydrocracking catalysts. If the end point of the feed is less than about 343° C., hydrotreating catalyst may be used. If the feed includes vacuum distillates, such as those boiling above 343° C., a combination of hydrotreating and vacuum gas oil hydrocracking catalysts may be used.

In some embodiments, if the distillate hydroprocessing reaction unit is an ebullated bed unit, the reactors may operate at temperatures in the range from about 380° C. to about 450° C., hydrogen partial pressures in the range from about 70 barn to about 170 bare, and liquid hourly space velocities (LHSV) in the range from about 0.2 hr$^{-1}$ to about 2.0 h$^{-1}$ The deasphalted vacuum residua hydrocracking reaction unit may be operated at a temperature in the range from about 360° C. to about 480° C.; from about 400° C. to about 450° C. in other embodiments. Pressures in each of the first and second reaction units may be in the range from about 70 bars to about 230 bara in some embodiments; from about 100 to about 180 bare in other embodiments. The hydrocracking reactions may also be conducted at a liquid hourly space velocity (LHSV) in the range from about 0.1 hr$^{-1}$ to about 3.0 hr$^{-1}$ in some embodiments; from about 0.2 hr$^{-1}$ to about 2 hr$^{-1}$ in other embodiments. The hydrocracking reactions may also be conducted at a hydrogen to oil ratio of about 5,000 to about 20,000 scf/bbl.

In some embodiments, operating conditions in the distillate hydroprocessing unit may be less severe than those used in the deasphalted vacuum residua hydrocracking unit, thus avoiding excessive catalyst replacement rates. Accordingly, overall catalyst replacement (i.e., for both units combined) is also reduced. For example, the temperature in the distillate hydroprocessing unit may be less than the temperature in the deasphalted vacuum residua hydrocracking unit. Operating conditions may be selected based upon the partially converted vacuum residua feedstock, including the content of impurities in the partially converted vacuum residua feedstock and the desired level of impurities to be removed in the distillate hydroprocessing unit, among other factors. In some embodiments, vacuum residua conversion in the deasphalted vacuum residua hydrocracking unit may be in the range from about 50 to about 75 wt %; from about 55 to about 70 wt % in other embodiments; and from about 60 to about 65 wt % in yet other embodiments, in addition to hydrocracking the partially converted resid, sulfur and metal removal may each be in the range from about 40% to about 75%, and Conradson carbon removal may be in the range from about 30% to about 60%, In other embodiments, at least one of an operating temperature and an operating pressure in the deasphalted vacuum residua hydrocracking unit may be greater than used in the distillate hydroprocessing unit.

Using process flow schemes according to embodiments disclosed herein, overall vacuum residua conversions of at least 80%, 90%, 92.5% 95%, 98% or higher may be attained, which is a significant improvement over what can be achieved with a two-unit hydrocracking system alone.

Referring now to FIG. 1, a simplified process flow diagram of current processes for upgrading virgin vacuum resid according to embodiments disclosed herein is illustrated. A virgin resid and hydrogen may be fed via flow lines 310 and 312, respectively, to a first hydrocracking reaction stage 314 containing a hydrocracking catalyst and operating at a temperature and pressure sufficient to convert at least a portion of the resid to lighter hydrocarbons. The first stage reactor effluent may be recovered via flow line 316. The first stage effluent may include reaction products and unreacted resid, which may include unreacted feed components such as asphaltenes, and hydrocracked asphaltenes having various boiling points, including those in the boiling range of the resid feedstock.

The first hydrocracking reaction stage 314 may include one or more reactors in series and/or parallel. Reactors suitable for use in the first hydrotreating and hydrocracking reaction stage may include ebullated bed reactors. In some embodiments, the first hydrocracking reaction stage 314 includes only a single ebullated bed reactor.

A deasphalted oil fraction and hydrogen may be fed via flow lines 318 and 380, respectively, to a second hydrocracking reaction stage 322 containing a hydrocracking catalyst and operating at a temperature and pressure to convert at least a portion of the deasphalted oil to lighter hydrocarbons. The second stage reactor effluent may be recovered via flow line 324.

The second hydrocracking reaction stage 322 may include one or more reactors in series and/or parallel. Reactors suitable for use in the second hydrocracking reaction stage may include ebullated bed reactors. The number of reactors required may depend on the feed rate, the overall target resid conversion level, and the level of conversion attained in the first hydrocracking reaction stage. In some embodiments, the second hydrocracking reaction stage 322 includes only a single ebullated bed reactor.

The first stage reactor effluent and the second stage reactor effluent may be fed via flow lines 316, 324 to separation system 326. The atmospheric distillates may be recovered via flow line 356. The vacuum distillates may be recovered via flow line 362, and the second bottoms fraction may be recovered via flow line 330 and processed in the solvent deasphalting unit 332 as described above for solvent deasphalting unit 32. The deasphalted oil fraction 318 may be sent to the second hydrocracking reaction stage 322 and the pitch 320 may be recovered.

Figure 2:
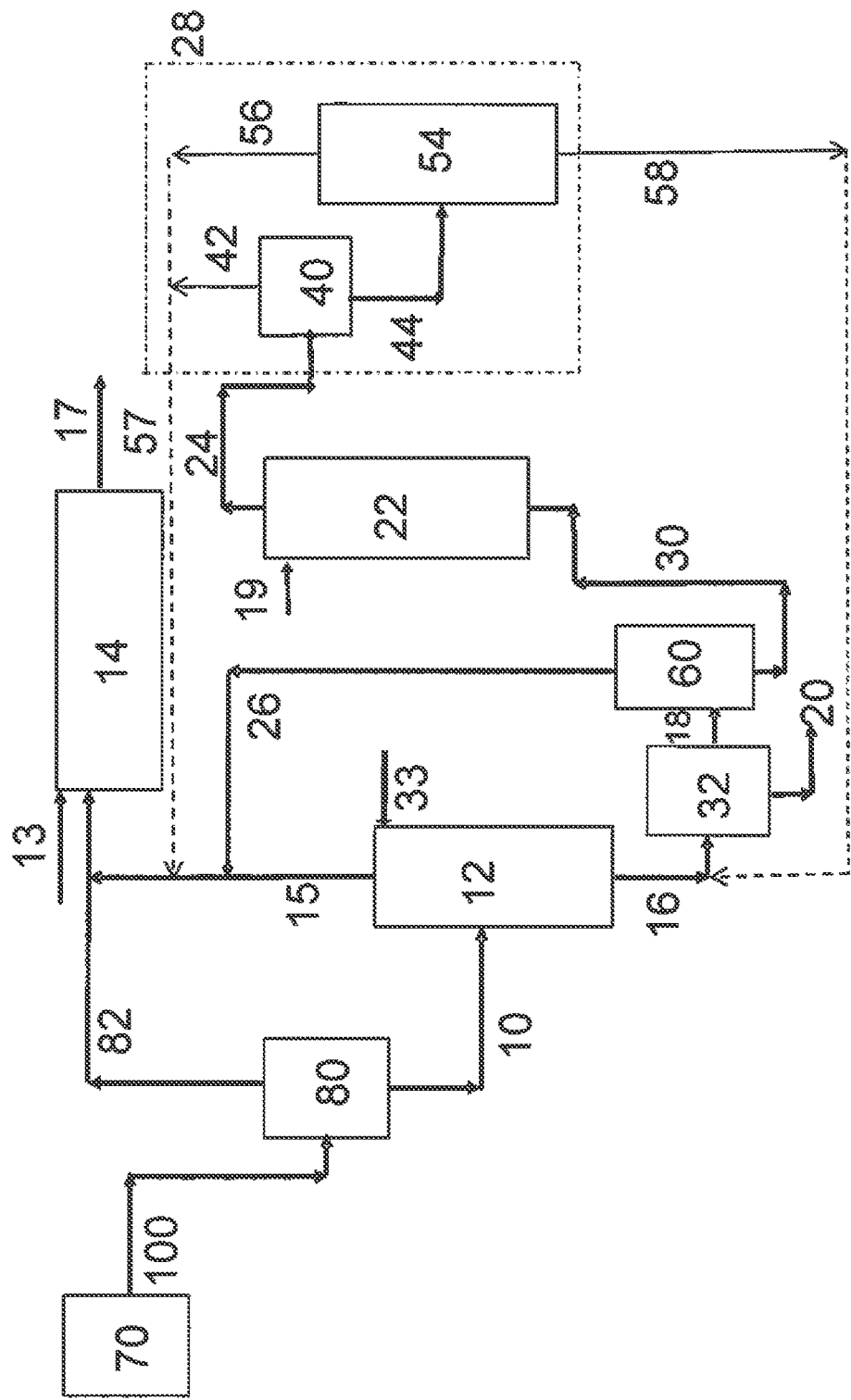
FIG. 2 is a simplified flow diagram of a hydrocracking and deasphalting process for upgrading partially converted vacuum residua according to embodiments disclosed herein.

Referring now to FIG. 2, a simplified process flow diagram of processes for upgrading partially converted vacuum residua according to embodiments disclosed herein is illustrated. Pumps, valves, heat exchangers, and other equipment are not shown for ease of illustration of embodiments disclosed herein.

In some embodiments, a vacuum residua hydrocarbon feedstock may be fed to an upstream process which produces an effluent including the partially converted vacuum residua hydrocarbon feedstock. The upstream process converts some of the heavier components in the vacuum residua hydrocarbon feedstock.

In some embodiments, an effluent from an upstream process 70 may initially be fed to a high pressure high temperature separator 80 (HP/HT separator) via flow line 100. The effluent 100 may be a partially converted vacuum residua. The partially converted vacuum residua feedstock may be derived from any of a variety of upstream feed processing units which partially convert residua feeds. These processes are sometimes called "bottom of the barrel processes." These bottom of the barrel processes may include an upstream hydrocracking unit, vac resid coking unit, a hydrothermolysis unit, a hydropyrolysis unit, a pyrolysis unit, an oil shale retorting process, a biomass pyrolysis process, a biomass hydropyrolysis process, a biomass hydrothermolysis process, a tar sands extraction process, or combinations thereof. The partially converted vacuum residua may also be derived from heavy oil streams produced by steam assisted gravity drainage, toe to heel air injection, an in situ petroleum extraction process, or any combination thereof. In some embodiments, the upstream hydrocracking unit may be an ebullated bed hydrocracking unit, a fixed bed hydrocracking unit, or a moving bed hydrocracking unit.

The HP/HT separator 80 may be located upstream of a mass transfer device 12. The HP/HT separator 80 separates the partially converted vacuum residua from the upstream process into a vapor fraction and a liquid fraction. The flashed liquid fraction of the partially converted vacuum residua, is fed via flow line 10 to the mass transfer device 12 to generate a first distillate and a first residuum. The vapor fraction may be recovered via flow line 82 and fed to the distillate hydroprocessing reaction unit 14.

The mass transfer device 12 may be a column, such as, but not limited to, a packed tower, an unpacked tower, or a tray column. In some embodiments, the mass transfer device 12 may be a stripping tower. A stripping medium may be fed to the stripping tower 12 via flow line 33. The stripping medium may be, but is not limited to, a non-reactive stripping medium, such as steam, hydrogen, nitrogen or fuel gas. If the stripping medium is steam, the steam may be superheated high pressure steam. The temperature of the steam may range from about 232° C. (450° F.) to about 371° C. (700° F.). The steam may be fed to the mass transfer device 12 through line 33 at a rate ranging from about 3 to about 20 pounds of steam/barrel of feed (about 13 to about 9.1 kg of steam/barrel of feed). The first distillate stream may have an ASTM D-1160 final boiling point in the range from about 427° C. (800° F.) to about 482° C. (900° F.). The first residuum stream may have a corresponding ASTM D-1160 initial boiling point in the range from about 800° F. to about 900° F.

From the stripping tower 12, the first distillate may be fed via flow line 15 to a distillate hydroprocessing reaction unit 14 containing a hydrotreating catalyst, a hydrocracking catalyst, or combinations thereof. Hydrogen may be added to the distillate hydroprocessing reaction unit 14 via flow line 13. The distillate hydroprocessing reaction unit 14 may operate at a temperature and pressure sufficient to convert at least a portion of the first distillate to lighter hydrocarbons. The distillate hydroprocessing reaction unit effluent, or a first hydroprocessing effluent, may be recovered via flow line 17. As described above, the distillate hydroprocessing reaction unit effluent may include hydroprocessed distillate products, which may include, but not limited to, hydrocarbons boiling in the range of a naphtha fraction, a kerosene fraction, and a diesel fraction. In some embodiments, the distillate hydroprocessing reaction unit effluent may be fractionated to provide the fractions listed. In some embodiments, the distillate hydroprocessing reaction unit 14 is a single fixed bed reactor.

From the stripping tower 12, the first residuum may be fed via flow line 16 to a solvent deasphalting (SDA) unit 32 to produce a deasphalted oil fraction and an asphaltenes fraction. The deasphalted oil fraction may be recovered from solvent deasphalting unit 32 via flow fine 18 and fed to a vacuum fractionation tower 60. The vacuum fractionation tower 60 provides a deasphalted gas oil and a heavy deasphalted residuum. The deasphalted gas oil stream may have an ASTM D-1160 final boiling point in the range from about 510° C. (950° F.) to about 566° C. (1050° F.). The heavy deasphalted residuum stream may have an ASTM D-1160 initial boiling point ranging from about 510° C. (950° F.) to about 566° C. (1050° F.).

In some embodiments, the asphaltenes fraction may be recovered from the SDA unit 32 via flow fine 20 and further processed. In other embodiments, the asphaltenes fraction may be recovered via flow line 20 and fed to a gasification unit (not shown) to produce a synthesis gas. The synthesis gas may be fed directly to or converted to hydrogen for use in one or more of the distillate hydroprocessing reaction unit 14 or the deasphalted vacuum residua hydrocracking unit 22. In some embodiments, the gasification unit may be such as those described in U.S. Pat. Nos. 8,083,519 and 7,993,131.

The deasphalted gas oil may be fed via flow line 26 to the distillate hydroprocessing reaction unit 14. The deasphalted vacuum residuum may be fed via flow line 30 to a deasphalted vacuum residua hydrocracking reaction unit 22. Hydrogen may be added to the deasphalted vacuum residua hydrocracking reaction unit 22 via flow line 19. The deasphalted vacuum residua hydrocracking reaction unit 22 may be an ebullated bed reaction system having one or more ebullated bed reactors or a slurry reactor system having one or more slurry reactors. The deasphalted vacuum residua reactor effluent, or second hydroprocessing effluent, may be recovered via flow line 24 and fed to separation system 28. The separation system 28 may separate the vapor and liquid. The vapor may be recovered via flow line 56 and the liquid may be recovered via flow line 58. Optionally, the vapor may be directed to the first hydrotreating/hydrocracking reaction unit 14 and the liquid may be directed to the SDA 32.

In some embodiments, separation system 28 may include a high pressure high temperature separator 40 (HP/HT separator) for separating the second unit reactor effluent liquid and vapor. The separated vapor may be recovered via flow line 42, and the separated liquid may be recovered via flow line 44.

The separated liquid stream may then be fed via flow line 44 to an atmospheric distillation tower 54 to separate the stream into a fraction including hydrocarbons boiling in a range of atmospheric distillates and an atmospheric residuum fraction including hydrocarbons having a normal boiling point of at least 343° C. The atmospheric distillates may be recovered via flow line 56, and the atmospheric residuum fraction may be recovered via flow line 58. Optionally, the separated vapor via flow line 42 and the vapor via flow line 56 may be directed to the distillate hydroprocessing reaction unit 14 via flow line 57.

The atmospheric distillates may be fed to the distillate hydroprocessing reaction unit 14 and processed along with the deasphalted gas oil and the first distillate. In some embodiments, the atmospheric distillates, the deasphalted gas oil and the first distillate may be fed independently to the distillate hydroprocessing reaction unit 14 or may be combined upstream of the distillate hydroprocessing reaction unit 14 prior to entering the distillate hydroprocessing reaction unit 14. In some embodiments, the atmospheric residuum fraction may be combined with the first residuum and fed to the SDA unit 32. In some embodiments, the atmospheric residuum fraction and the first residuum may be fed independently to SDA unit 32 or may be combined upstream of the SDA unit prior to entering the SDA unit 32.

The vapor fraction from the HP/HT separator 80, the first distillate from the stripping tower 12, and the deasphalted gas oil from the vacuum fractionation tower 60 may be combined and fed to the distillate hydroprocessing reaction unit 14 or those streams may be fed independently to the distillate hydroprocessing reaction unit 14. Optionally, the atmospheric distillates from the separation system 28 may be combined with the vapor fraction from the HP/HT separator 80, the first distillate from the stripping tower 12, and the deasphalted gas oil from the vacuum fractionation tower 60 and fed to the distillate hydroprocessing reaction unit 14 or those streams may be fed independently to the distillate hydroprocessing reaction unit 14.

Figure 3:
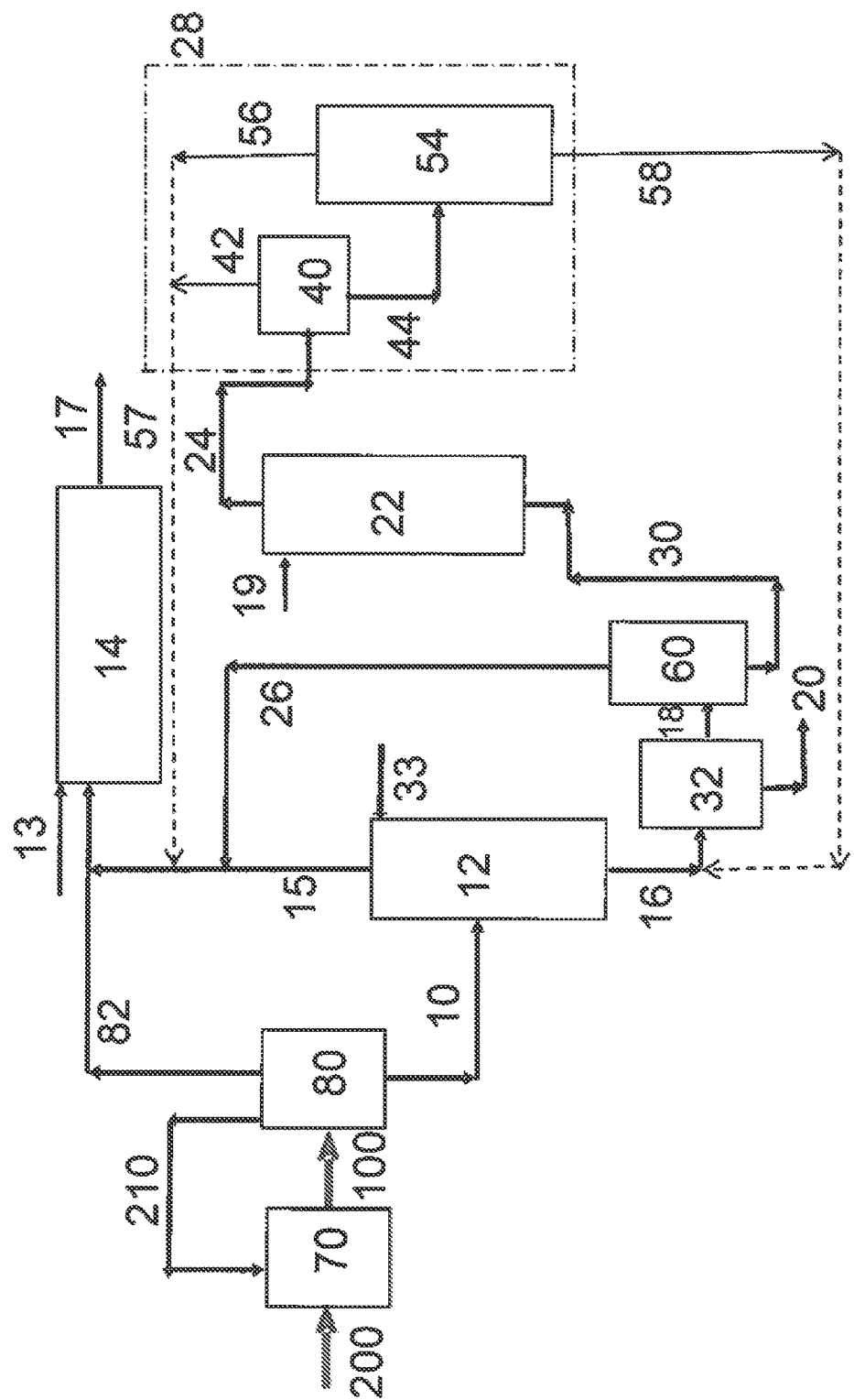
FIG. 3 is a simplified flow diagram of a hydrocracking and deasphalting process for upgrading partially converted vacuum residua according to embodiments disclosed herein.

Referring now to FIG. 3, a simplified process flow diagram of processes for upgrading partially converted vacuum residua according to embodiments disclosed herein is illustrated, where like numerals represent like parts. The partially converted vacuum residua from upstream bottom-of-the-barrel processes may be produced from a tar sands-derived bitumen stream. The tar sands-derived bitumen stream is fed via flow line 200 along with a diluent stream having an end boiling point lower than 510° C. and preferably lower than 343° C. via flow line 210 to the upstream bottom-of-the-barrel process 70. In some embodiments, the effluent from the upstream bottom-of-the-barrel process 70 may generate a synthetic crude oil containing distillate boiling material and at least a partially converted vacuum residua component. The synthetic crude oil may be fed through flow line 100 to the HP/FIT separator 80 to recover the diluent stream via flow line 210; the distillate stream via flow line 82 and the flashed liquid fraction of the partially converted vacuum residua via flow line 10. The diluent may be recycled back to the upstream bottom-of-the-barrel process 70.

EXAMPLES

In an exemplary embodiment, the process according to FIG. 1 may have about 40,000 BPSD of virgin vacuum residua fed via line 310 to first hydrocracking reaction stage 314. The first hydrocracking reaction stage 314 may operate at a temperature and pressure sufficient to convert about 52% of the vacuum residua. The SDA 332 may be operated in such a manner and with such solvents to achieve a DAO lift between about 70 to about 80%. The second hydrocracking reaction stage 322 may operate at temperature and pressure sufficient to convert from about 75 to about 85% of the DAO. The prospective overall flowrates and properties for the major, intermediate and product streams are summarized in Table 1 below:

TABLE 1

| | Stream | | | | |
|---|---|---|---|---|---|
| | 330 | 318 | 320 | 356 | 362 |
| BPSD | 18858 | 15505 | 3353 | 21264 | 18120 |
| API Gravity | 4.93 | 9.07 | −9.85 | 40.3 | 18.03 |
| Specific Gravity | 1.037 | 1.007 | 1.163 | 0.8236 | 0.9463 |
| Sulfur, wt % | 1.45 | 1.18 | 2.5 | 0.094 | 0.515 |
| Nitrogen, wt % | 0.65 | 0.435 | 1.5 | 0.081 | 0.34 |
| CCR, wt % | 23.0 | 14.2 | 58.4 | — | 0.56 |
| Ni + V, wppm | 148 | 31 | 615 | — | <2 |

The Polynuclear Cyclic Index (PCI) quantifies the polynuclear aromatics concentrations in heavy petroleum oils. The PCI of a straight run VGO may have a value of about 2000 to about 4000. The processed vacuum gas oil fraction in line 362 may have a PCI value of about greater than about 9,000 and as high as about 15,000 to about 16,000, depending upon the distillation end point of the VGO and the source of the crude oil used to generate the straight run VGO. The increased PCI index of the processed vacuum gas oil fraction in line 362 may increase the difficulty for upgrading to diesel and other middle distillates using conventional fixed-bed hydrotreaters/hydrocrackers. Fixed-bed hydrotreaters/hydrocrackers designs for high PCI feeds may require at least one of the following: frequent catalyst changeouts, i.e., very short on-stream times of the order of 12 months or less; extremely high hydrogen partial pressures, such as about 25 to about 40% higher than for straight run VGO fixed-bed hydrotreaters/hydrocrackers; or prohibitively expensive catalyst loadings of from about 100 to about 200% higher than for straight run VGO fixed-bed hydrotreaters/hydrocrackers. If the processed vacuum gas oil fraction in line 362 is fed to a fixed-bed hydrotreater/hydrocracker for maximum diesel production rather than processing in a fluid catalytic cracking (FCC) unit, an increase from about 20 to about 25% in the diesel yield may be expected. In other words, feeding 40,000 BPSD of virgin vacuum resid to the process in FIG. 1 and including a fixed hydrotreater/hydrocracker to process the processed vacuum gas oil fraction may result in an increase of 28,000 BPSD of diesel.

In comparison, the process according to FIG. 2 may have about 40,000 BPSD of virgin vacuum residua fed to upstream bottom-of-the-barrel process 70. The mass transfer device 12 may be a steam stripper operated at a stem/oil ratio of about 0.03 kg/kg and a pressure of about 2 bar. The SDA 32 may be operated to achieve an about 86% lvol % lift. The asphaltenes fraction from the SDA unit 32, via flow line 20, may be gasified to produce synthesis gas, may be combusted in a fluid bed boiler to generate steam, or may be fed to a delayed coker. The deasphalted vacuum residua hydrocracking unit 22 may be operated to achieve about 85% conversion. The prospective overall flowrates and properties for the major, intermediate and product streams are summarized in Table 2 below:

TABLE 2

| | Stream | | | |
|---|---|---|---|---|
| | 16 | 58 | Combined 16 + 58 | 26 | 20 |
| BPSD | 24000 | 6000 | 30000 | 26007 | 3993 |
| API Gravity | 8.3 | 14.75 | 9.56 | 12.63 | −7.29 |
| Specific Gravity | 1.012 | 0.967 | 1.002 | 0.9817 | 1.139 |
| Sulfur, wt % | 1.29 | 0.28 | 1.075 | 0.87 | 2.26 |
| Nitrogen, wt % | 0.61 | 0.39 | 0.562 | 0.42 | 1.38 |
| CCR, wt % | 17.3 | 12.7 | 115.2 | 8.2 | 54.5 |
| Ni + V, wppm | 119 | 10 | 98 | 18.2 | 541 |

The vacuum gas oil produced from feeding partially converted vacuum residua according to the process of FIG. 2 has a much lower PCI form the vacuum gas oil produced according to the process of FIG. 1 as shown in Table 3 below:

TABLE 3

| | Stream | |
|---|---|---|
| | 362 (FIG. 1) | 15, 26 and 56 (FIG. 2) |
| API Gravity | 18.03 | 18.5 |
| Specific Gravity | 0.9463 | 0.9433 |
| Sulfur, wt % | 0.515 | 0.49 |
| Nitrogen, wt % | 0.34 | 0.32 |
| CCR, wt % | 0.56 | 0.4 |
| Ni + V, wppm | 9000 | 3000 |

As shown above the vacuum gas oil produced from feeding partially converted vacuum residua according to the process of FIG. 2 may be processed in distillate hydroprocessing reaction unit 14 at conventional hydrogen partial pressure, space velocities and catalyst on stream times. The process according to embodiments of FIG. 1, compared to embodiments of FIG. 3, may provide one or more of the following: increasing diesel production rates from about 28,000 to about 33,400 BPSD, a 193% relative increase; improving the catalyst cycle length of the fixed-bed hydrotreaters/hydrocrackers 14 by about 12 to about 24 months; reducing the hydrogen partial pressures of the fixed-bed hydrotreaters/hydrocrackers 14 by about 25%; and reducing the PCI of the vacuum gas oil by about 663%.

As described above, embodiments disclosed herein provide for the efficient conversion of heavy hydrocarbons to lighter hydrocarbons via an integrated hydrocracking and solvent deasphalting process. More specifically, embodiments described herein provide an efficient and effective means for upgrading hard-to-convert species in feedstocks derived from other partial conversion processes. Advantageously, the partially converted vacuum residua feedstock may be processed separately from a virgin-like vacuum residua feed, thereby addressing the issues that may arise with the feeds having different compositions. Process flexibility may be provided by handling the virgin vacuum residua and the partially converted vacuum residuum in different trains. The flexibility may be found by tailoring the operating conditions for the specific feed. The sizing of the process units may also be reduced by having the feeds in different trains. The hard to process species may be handled without large volumes of recycle.

In one aspect, processes according to embodiments disclosed herein may be useful for attaining a high overall feed conversion in a hydrocracking process, such as greater than 87%, 92%, 95% or 97% overall vacuum residua conversion.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for upgrading partially converted residuum hydrocarbons, the system comprising:
   a mass transfer device to strip a partially converted residuum hydrocarbon stream into a first distillate stream and a first residuum stream;
   a solvent deasphalting unit for recovering a deasphalted oil stream and an asphaltenes stream from the first residuum stream;
   a vacuum fractionation unit to fractionate the deasphalted oil stream to recover a deasphalted gas oil stream and a heavy deasphalted residuum stream;
   an ebullated bed hydroconversion reactor system for contacting the heavy deasphalted residuum stream and hydrogen with a first hydroconversion catalyst to produce a first effluent;
   an atmospheric fractionation unit to fractionate the first effluent to recover a hydrocarbon atmospheric distillate stream and a hydrocarbon atmospheric residuum stream;
   a fixed bed hydroconversion reactor system for contacting at least one of the first distillate stream, the deasphalted gas oil stream, and the hydrocarbon atmospheric distillate stream to produce a second effluent.

2. The system of claim 1, further comprising a gasification system for converting the asphaltenes stream to a synthesis gas.

3. The system of claim 1, further comprising an upstream conversion unit to convert a residuum stream to the partially converted residuum hydrocarbon stream.

4. The system of claim 3, wherein the upstream conversion unit is selected from the group consisting of a hydrocracking unit, a vac resid coking unit, a hydrothermolysis unit, a hydropyrolysis unit, a pyrolysis unit, an oil shale retorting unit, a biomass pyrolysis unit, a biomass hydropyrolysis unit, a biomass hydrothermolysis unit, a tar sands extraction unit, a steam assisted gravity drainage process, a toe to heel air injection process, an in situ petroleum extraction processes, or a combination thereof.

5. The system of claim 1, wherein the mass transfer device comprises a stripping tower.

6. The system of claim 4, wherein the hydrocracking unit comprises an ebullated bed, a fixed-bed or a moving-bed hydrocracking unit.

7. The system of claim 1, further comprising a high temperature/high pressure separator upstream of the steam stripper to produce the partially converted residuum hydrocarbon stream.

8. The system of claim 7, wherein a vapor fraction from the high temperature/high pressure separator is fed to the fixed bed hydroconversion reactor system.

9. The system of claim 1, further comprising a high temperature/high pressure separator upstream of the atmospheric fractionation unit to recover a vapor fraction and a liquid fraction from the first effluent of the ebullated bed hydroconversion reactor system.

10. The system of claim 9, wherein the vapor fraction from the high temperature/high pressure separator is fed to the fixed bed hydroconversion reactor system.

11. The system of claim 9, wherein the liquid fraction from the high temperature/high pressure separator is fed to the atmospheric fractionation unit.

* * * * *